United States Patent
Sinegal et al.

(10) Patent No.: US 7,334,911 B2
(45) Date of Patent: Feb. 26, 2008

(54) BI-LITE CAP FEATURING THE GROOVE LIGHT

(75) Inventors: Peter Leon Sinegal, San Diego, CA (US); Anthony Lonell Berry, Omaha, NE (US)

(73) Assignees: Peter L. Sinegal, San Diego, CA (US); Anthony L. Berry, Omaha, NE (US)

( * ) Notice: Subject to any disclaimer, the term of this patent is extended or adjusted under 35 U.S.C. 154(b) by 54 days.

(21) Appl. No.: 10/779,254

(22) Filed: Feb. 13, 2004

(65) Prior Publication Data

US 2005/0180128 A1    Aug. 18, 2005

(51) Int. Cl.
*F21V 21/084* (2006.01)
(52) U.S. Cl. .................. 362/105; 362/106; 362/103
(58) Field of Classification Search ............... 362/103, 362/108, 105, 190, 191, 473, 72, 238
See application file for complete search history.

(56) References Cited

U.S. PATENT DOCUMENTS

| | | | | |
|---|---|---|---|---|
| 4,477,865 A | * | 10/1984 | Tsuyama | 362/396 |
| 5,477,425 A | * | 12/1995 | Sun et al. | 362/476 |
| 5,738,432 A | * | 4/1998 | Okko et al. | 362/103 |
| 5,758,947 A | * | 6/1998 | Glatt | 362/105 |
| 6,227,688 B1 | * | 5/2001 | Taylor et al. | 362/473 |
| 2004/0100792 A1 | * | 5/2004 | Trzecieski | 362/103 |

* cited by examiner

*Primary Examiner*—Anabel Ton

(57) ABSTRACT

This sports utility item is a multi-purpose cap/light combination that consists of a light system with a groove-shaped outer case body connected to a platform, which is mounted on the center top of a modified sports cap and is secured in place with hook & loop fasteners. Primarily designed for night cycling, it produces high profile illumination from a slim lightweight unit design. It has an insertable/removable head guard system which provides limited head protection from impact during both night and day cycling or other activities. The invention also functions as a versatile light system for use in other night activities such as hiking, camping, skateboarding, night fishing, and more. The light system can also be mounted on other types of headgear such as bicycle helmets when the curved platform component of the total invention is used.

7 Claims, 16 Drawing Sheets

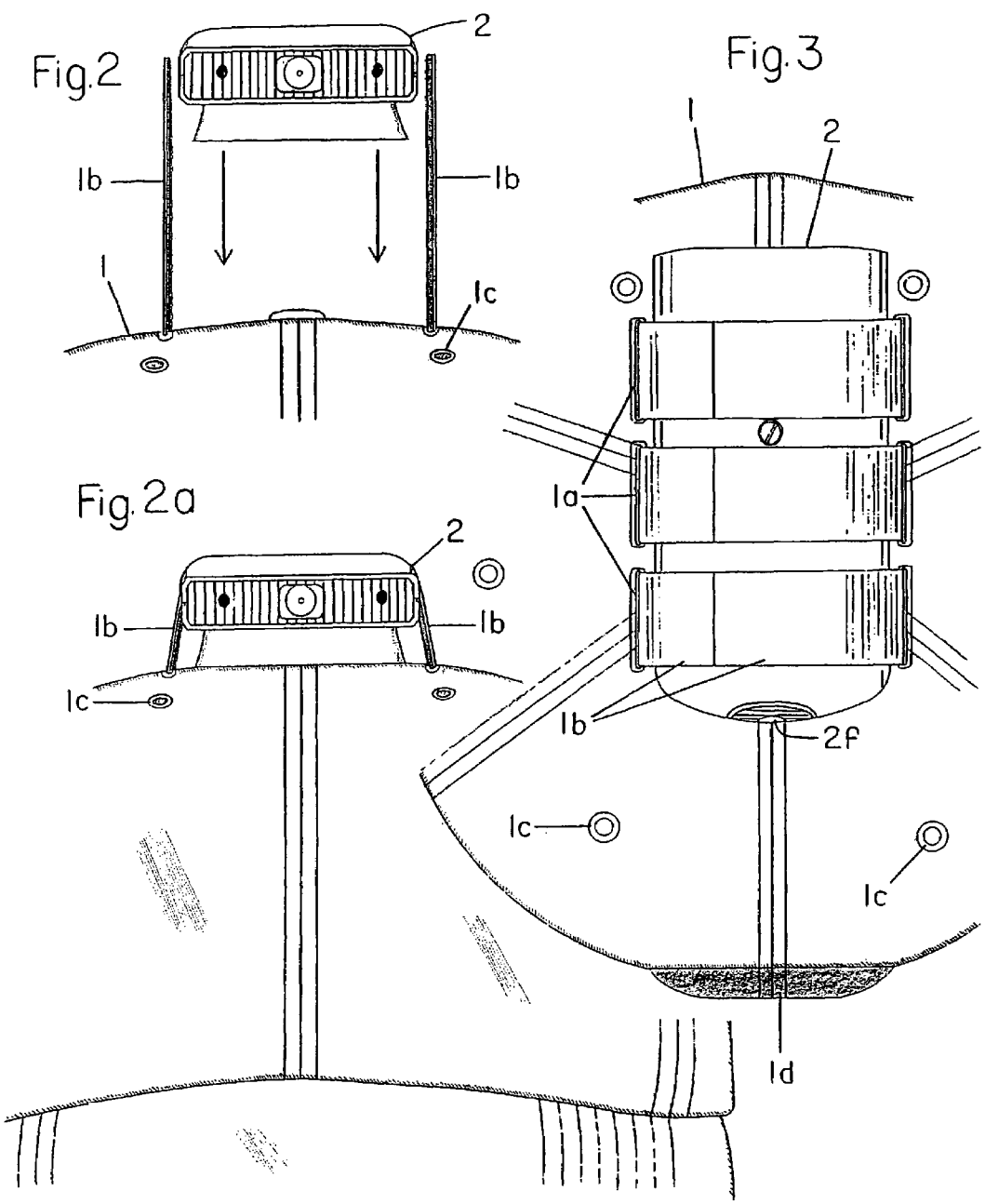

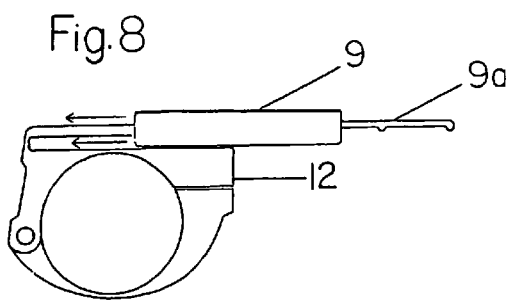
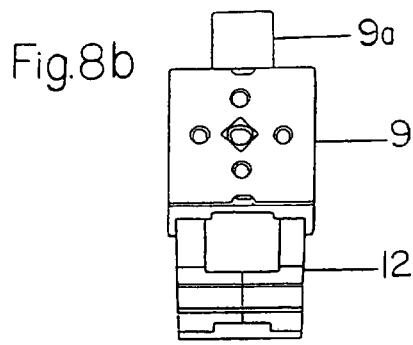
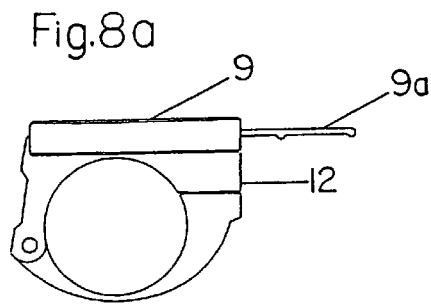
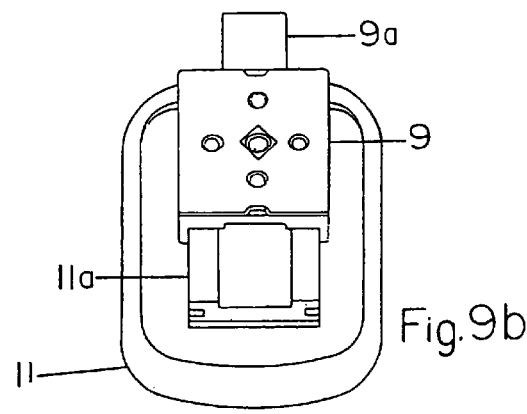
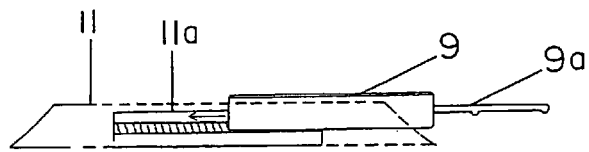
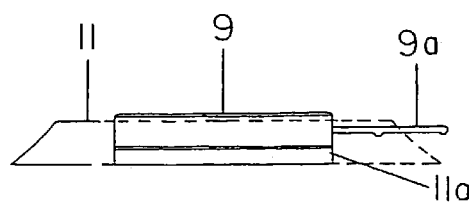
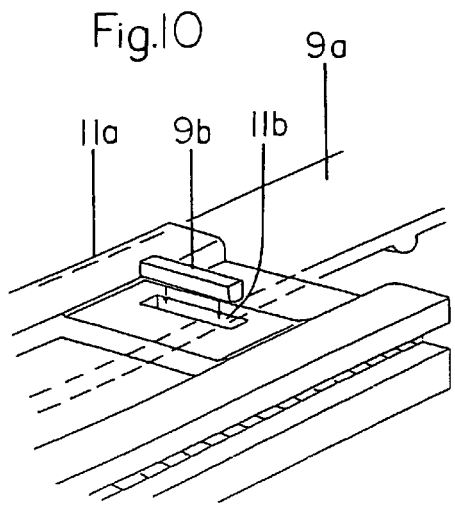

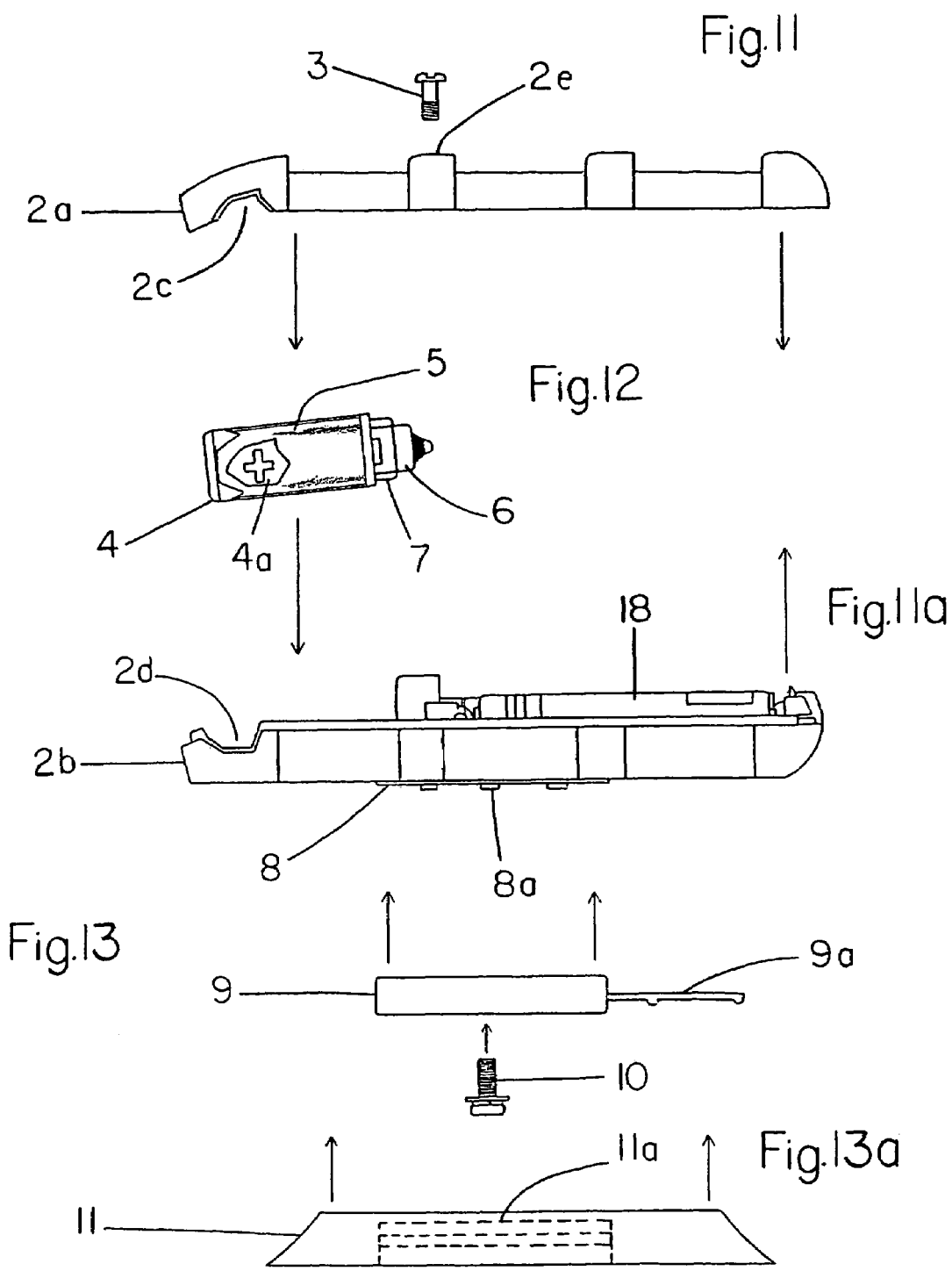

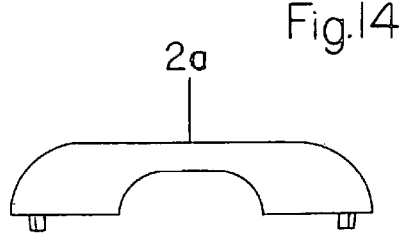
Fig. 14
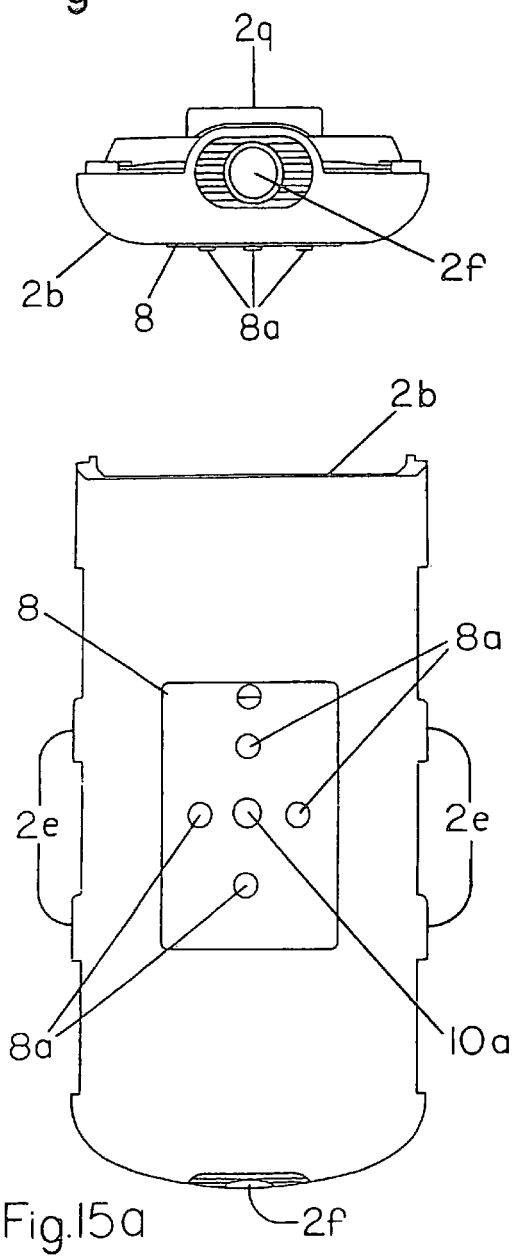
Fig. 14a
Fig. 15a
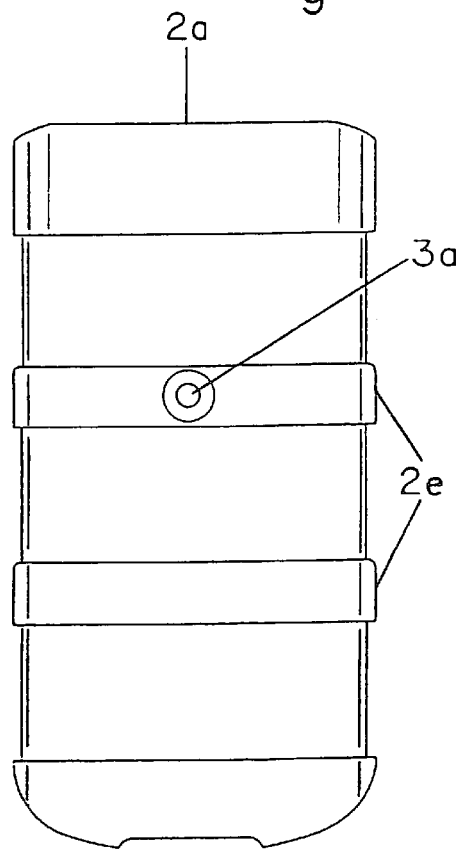
Fig. 15

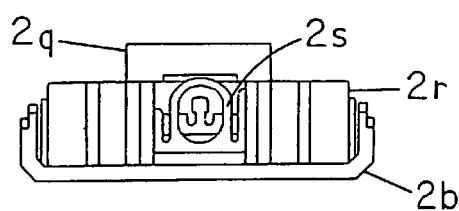
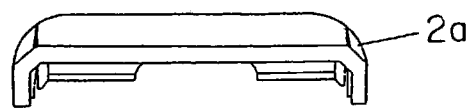
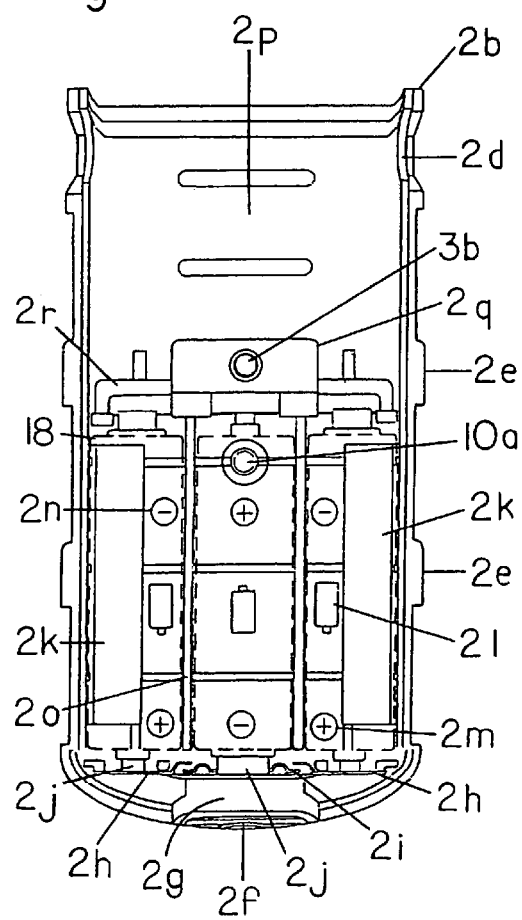
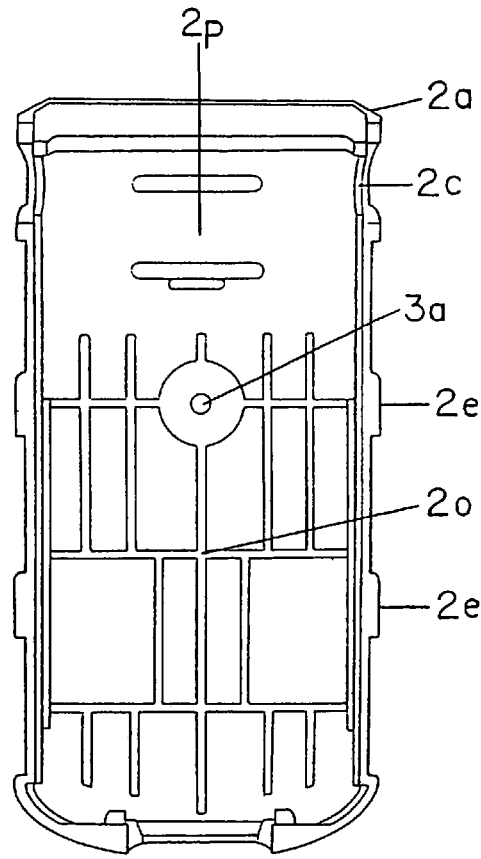

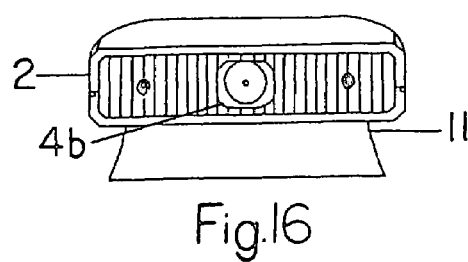
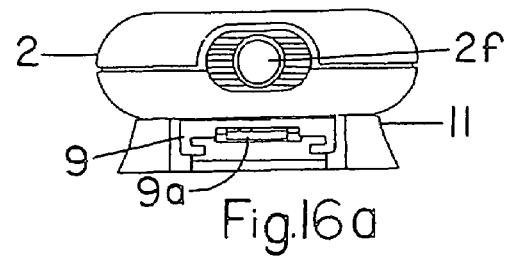
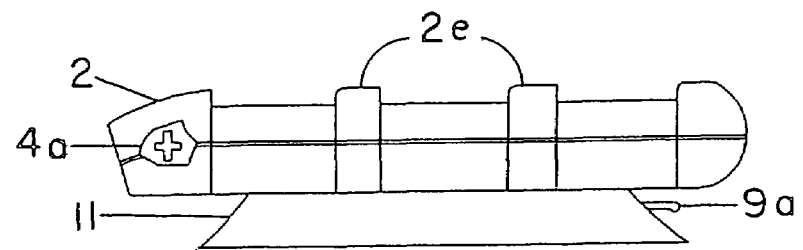
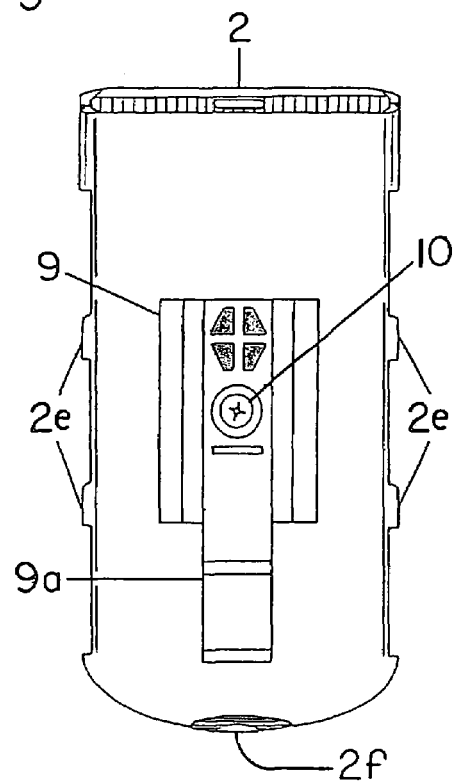
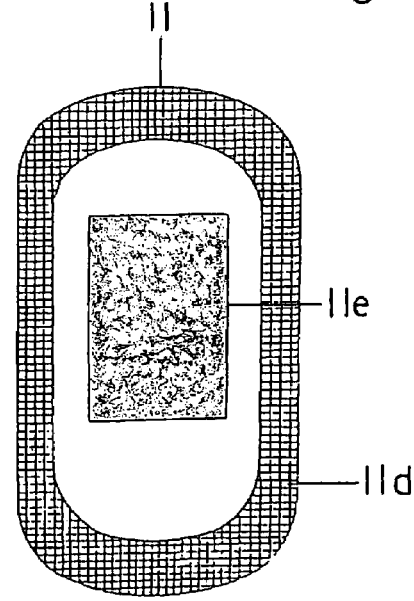

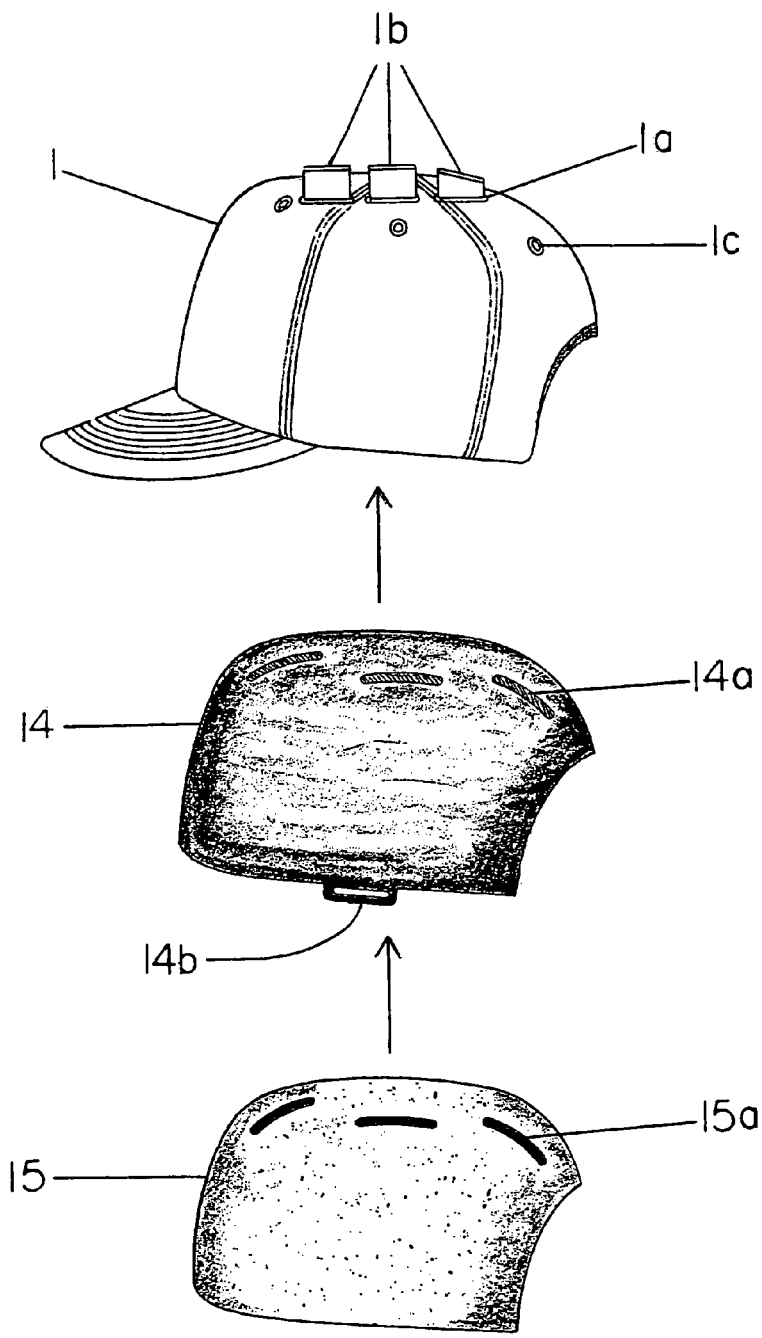

BI-LITE CAP FEATURING THE GROOVE LIGHT

BACKGROUND OF THE INVENTION

The present invention relates to sports cap mounted light systems that are usable for night activities and/or darkened light conditions. In particular the present invention relates to a multipurpose cap/light combination system specifically designed for bicycling at night, that also functions as a bicycle handlebar mounted light.

DESCRIPTION OF RELATED ART

In the field of cycling lights, both the serious and casual cyclists were traditionally limited to the use of handlebar mounted types of cycling lights for night riding purposes. More recently though during the past decade or so, a newer style of cycling light has emerged. This newer style of light can be mounted on your basic bicycle helmet. These helmet-mounted cycling lights normally mount onto the top center portion of the typical cycling helmet, usually attached to it with hook & loop fasteners or other devices, and can also in most cases be mounted on most bicycle handlebars, by using the proper adaptive hardware. Though useful, this type of cycling light is limited in headwear use to the cycling helmet. However observing the current mainly adult marketplace for the casual and avid cyclists, it can be noted that more people today than ever wear baseball type sportscaps rather than helmets while cycling either day or nights. From this then there appears to be a rather large market for this type of headwear among many cyclists in general. Helmet/or headwear mounted cycling lights allow more versatility to the night-riding cyclist in that the cyclist can illuminate any area his or her head is turned towards, unlike handlebar-mounted cycling lights which can only illuminate the area that the bicycle is steered. And although there are some cap/light combination inventions, very few if any appear to be primarily designed for night cycling, and generally offer no versatility beyond the use of a cap mounted light. As an example, the cap/light combination disclosed in Kirk U.S. Pat. No. 6,250,769 provides a baseball type cap supporting a flashlight type of light source on the top center portion of its visor with the use of hook & loop fasteners, providing a light beam parallel to the center of the cap's visor. The disclosed invention's design however presents the problem of too much forward weight at the front of the cap, and lack of versatility for mounting the light on items such as bicycle handlebars or cycling helmets, as well as no specific modifications done to the cap for safety purposes beyond the light's attachment.

BRIEF DESCRIPTION OF THE DRAWINGS

FIGS. 2 and 2a are enlarged front perspective views generally featuring the top portion of the cap showing the light fixture above the base unit (cap), unmounted and unfastened by the open hook & loop fastener straps and showing the light mounted and fastened into place by the closed fastener straps.

FIG. 3 is a top perspective view of a fully assembled bi-lite cap that shows how the hook & loop straps fasten the groove light into place.

FIGS. 8, 8a, and 8b are a side perspective view of the groove light's bracket connector sliding into the locked position on the handlebar bracket, being in the locked position, and a top/front view of the same.

FIGS. 9, 9a, and 9b are a side perspective view of the light system's bracket connector sliding into the locked position on the light platform, being in the locked position, and a top/front view of the same.

FIG. 10 illustrates a blow-up of the lock notch on the release lever of the bracket connector as it fits into the notch-catch hole on the platform bracket.

FIGS. 11 and 11a are a side perspective view of the separated top and bottom halves of the groove light's outer case.

FIG. 12 is a side perspective view of the pre-installed lense/bulb assembly of the light system.

FIG. 13 is a side perspective view of the light system's unattached bracket connector. FIG. 13a is a side perspective view of the light system's disconnected light platform.

FIGS. 14 and 14a are a rear perspective view of the separated top and bottom sections of the outer case also showing parts of the light's electro/mechanical assembly. FIGS. 14b and 14c are a front perspective view of the separated top and bottom sections of the groove light's outer case and showing parts of the electro/mechanical assembly.

FIGS. 15 and 15a are top and bottom perspective views of the two halves of the light's outer case. FIGS. 15b and 15c are an underside perspective view and a topside perspective view of the separated outer case of the groove light including a full overview of the electro/mechanical assembly.

FIG. 16 is a front perspective view illustrating the light system connected to the platform. FIG. 16a is a rear perspective view showing the light system and the light platform in the same situation as in FIG. 16.

FIG. 17 is a side perspective view showing the light system and platform in a connected position.

FIG. 18 is a bottom perspective view illustrating key components of the groove light's outer case and bracket connector.

FIG. 19 is a bottom perspective view of the light platform illustrating it's key components.

FIG. 21 is a side perspective view of the cap, cap guard plastic outer shell, and the styrofoam inner guard/insert in combination and how they all come together in stages.

DETAILED DESCRIPTIONS OF THE DRAWINGS

Figure 1:
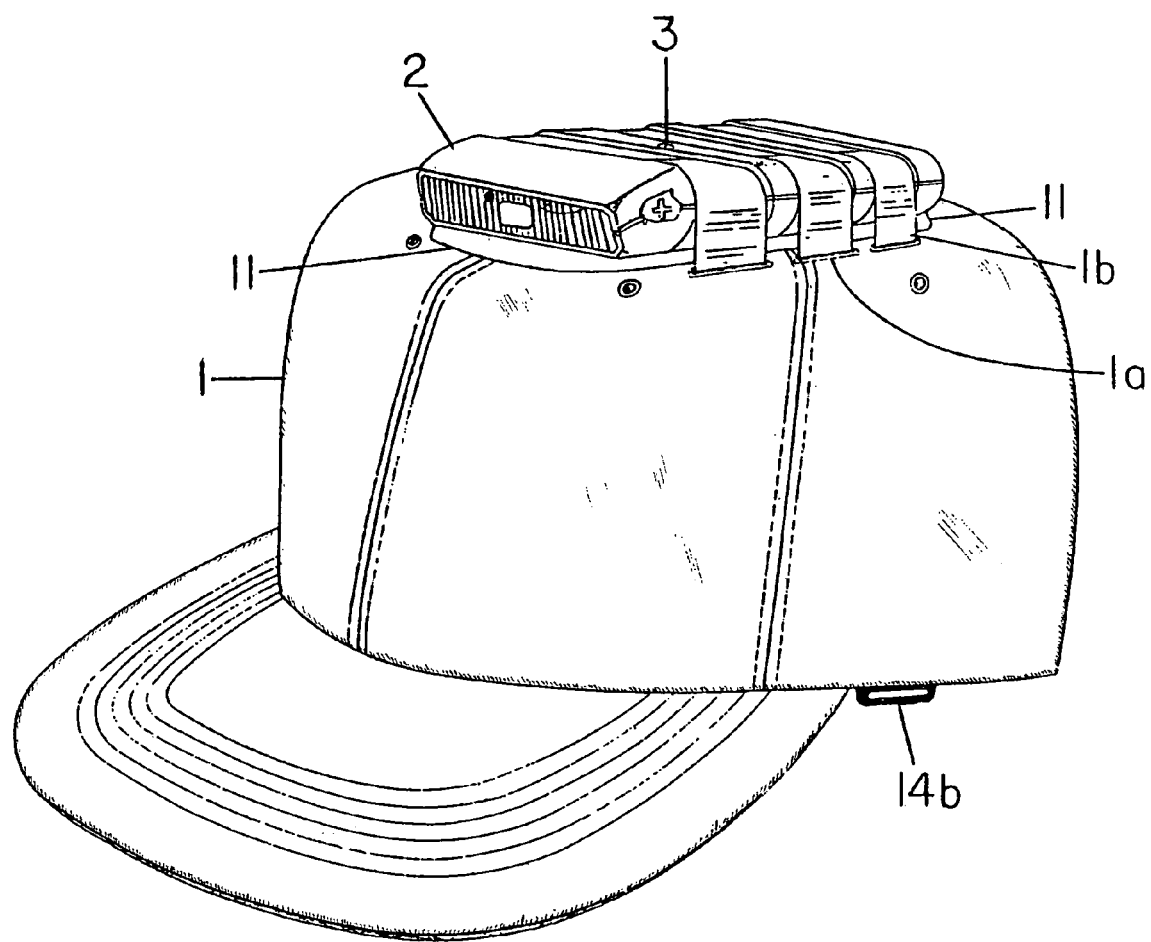
FIG. 1 is a perspective ¾ view of the cap/light combination heretofore known as the bi-lite cap featuring the groove light, showing it in full assembly minus the optional chin strap (design forthcoming.)
Figure 1A:
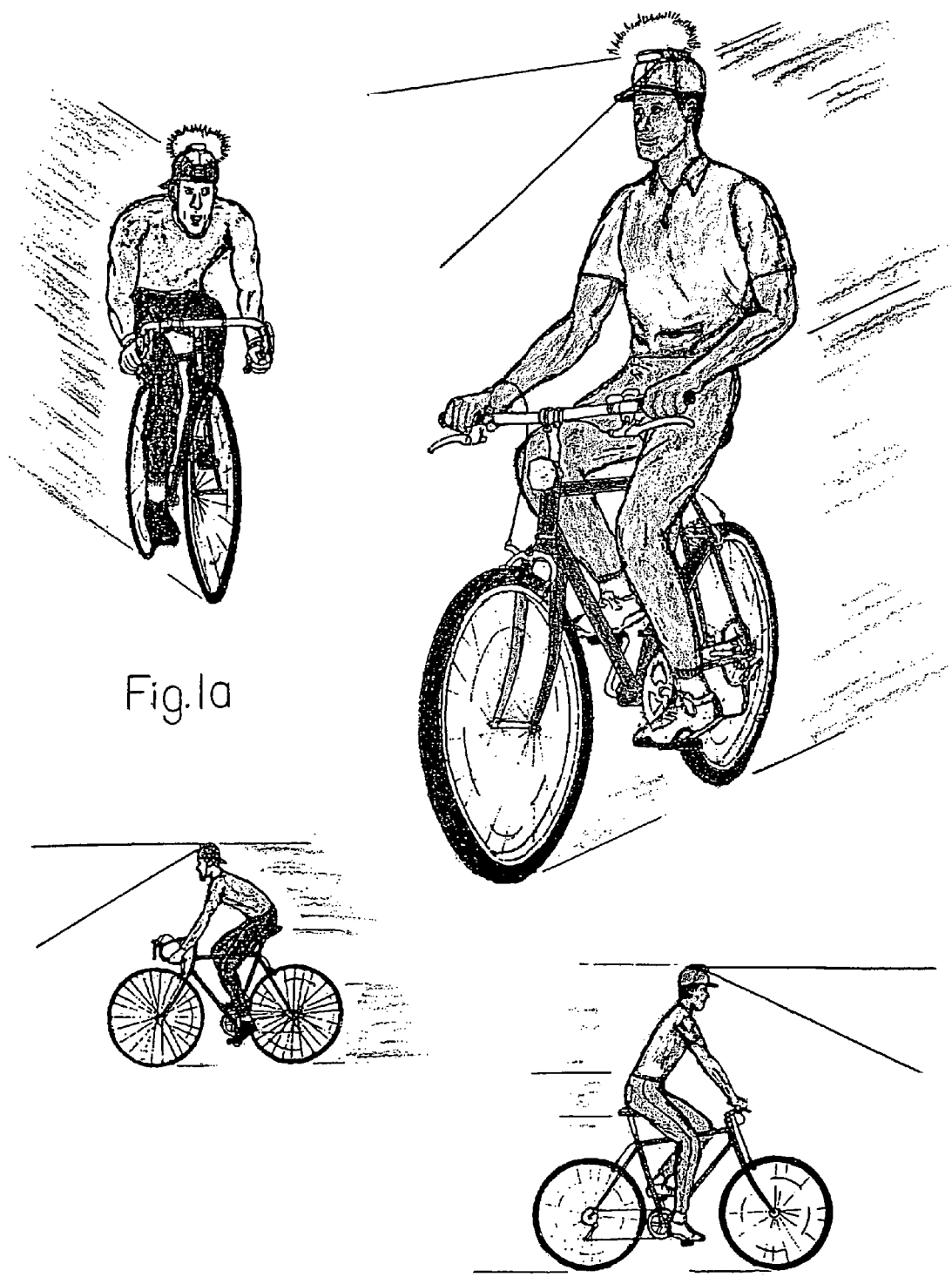
FIGS. 1a and 1b are a two part collage illustrating a number of the bi-lite cap's many uses, such as for cycling, skateboarding, hiking, fishing, and a hand-held flashlight when utilized at night/low light conditions, etc.
Figure 1B:
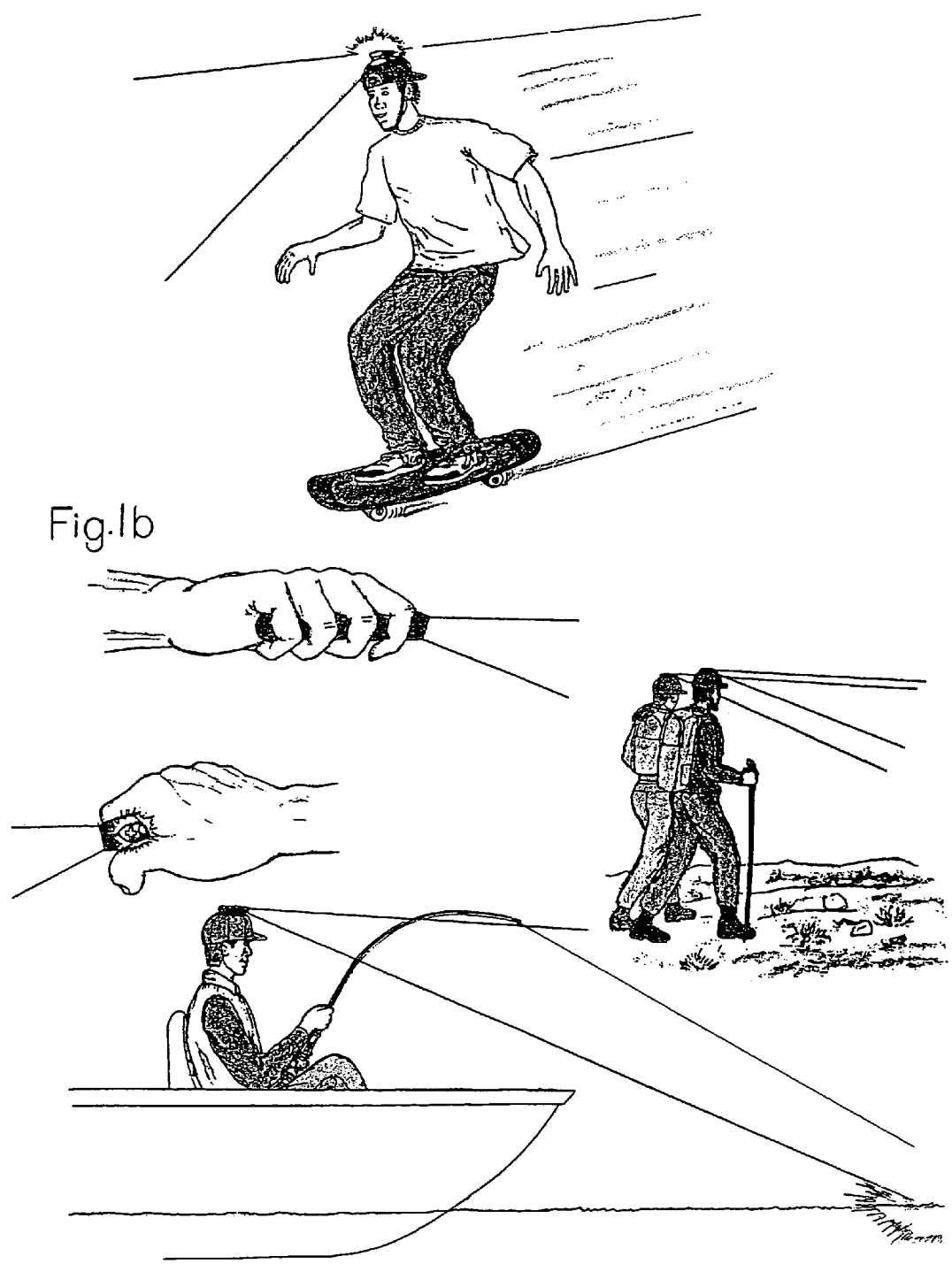

FIG. 1 illustrates the general invention completely assembled and showing the base unit 1 supporting the light system 2, that is connected to the light platform 11, to which both are mounted on top of and fastened to the base unit (or cap) 1 by hook & loop straps 1*b* that fit through the embroidered cap slots 1*a*. At the top of the light system 2 is shown the screw 3 that secures the outer case embodiment of the groove light 2. Shown at the bottom right of the cap 1 is the cap guard slot tab 14*b* (FIG. 20) that is used with an optional chin strap. (design forthcoming).

FIG. 2 is an enlarged illustration showing the front top of the invention with the light system 2 elevated above and unattached to the cap 1, with the hook & loop straps 1*b* open and parallel to either side of the light system 2 also known as the groove light. This hook & loop strap design allows for quick mounting attachment and quick/easy removal of the light system 2 by the cap wearer.

In FIG. 3 the top of the invention is shown as in FIG. 1 illustrating how the groove light 2 fits proportionately on the cap 1 and is attached to it securely with 6 hook & loop straps 1*b* (six loose straps combining into 3 fastened straps) that fit through the embroidered cap slots 1*a*, and inside the grooves on the outer case of the light system. Also shown is the top of the reflective strip 1*d* at the rear of the cap 1, and the vent holes 1*c*.

Figure 4:
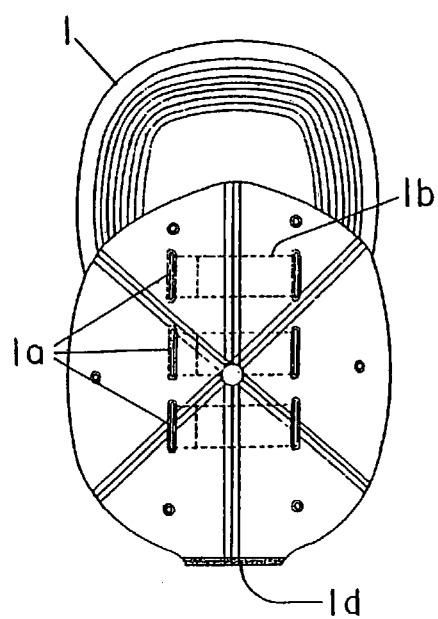
FIGS. 4 and 4a are over and under perspective views illustrating how the hook & loop fastener straps both fit through the embroidered slots on the cap, and how the straps are connected to the underside of the cap.
Figure 4A:
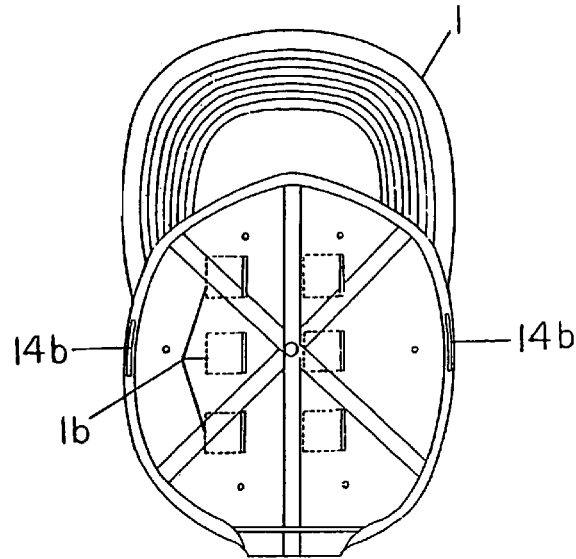

In FIG. 4 an overview of the invention is shown indicating how the (outlined) hook & loop straps 1*b* fold down/or fasten into place minus the groove-light mounted on top, also illustrating the cap slots 1*a* and how the hook & loop straps 1*b* fit through them, again showing the top of the reflective strip 1*d*.

Figure 5:
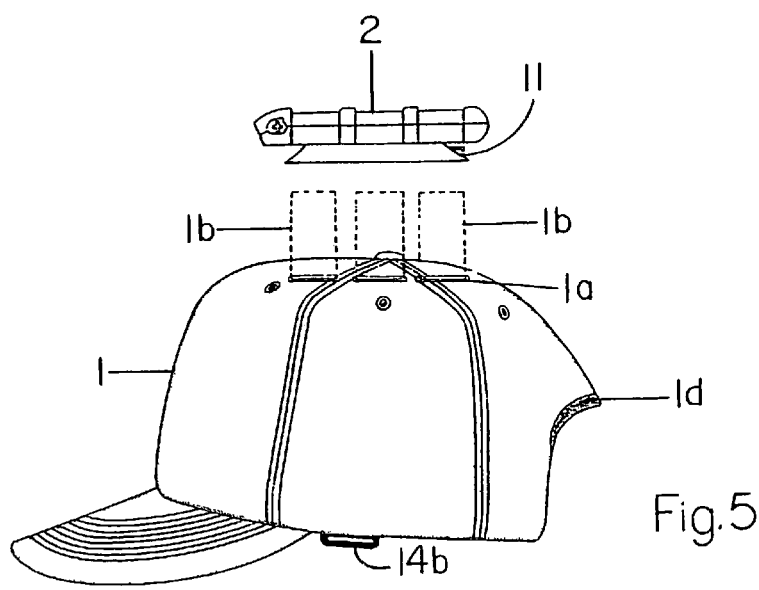
FIG. 5 is a side perspective view showing the light system above the cap unattached by the hook & loop straps.

FIG. 5 illustrates a side view of the groove light 2 connected to its platform 11, unmounted above the cap 1 with the hook & loop straps 1*b* (outlined/transparent) open and pointing up from within the cap slots 1*a*. The reflective strip 1*d* is shown again at the rear; also illustrated at the bottom is one of the two cap guard slot tabs 14*b*, which protrude from the sides of the bottom rim of the cap 1 through two embroidered slots on the bottom rim. The slot tabs 14*b* of the cap guard 14 are designed to be used with an optional/adjustable chin strap (design forthcoming).

Figure 6:
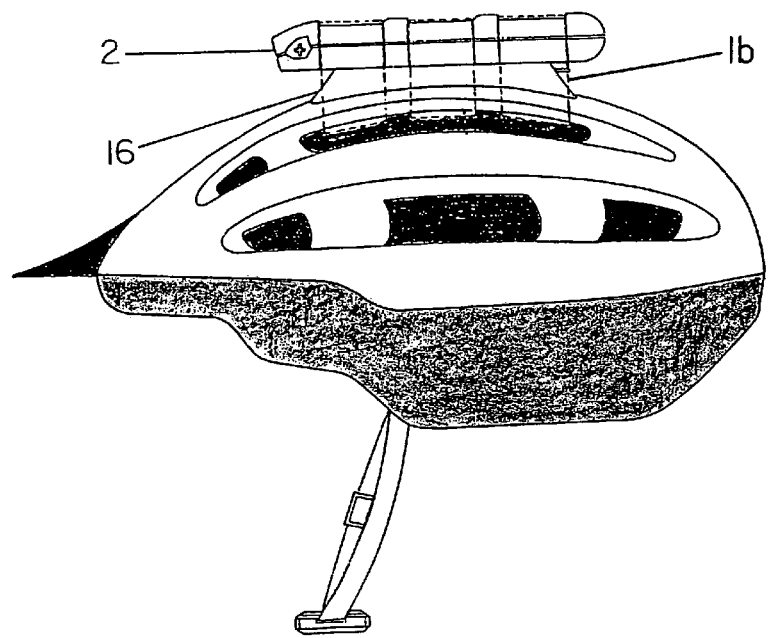
FIGS. 6 and 6a are a side perspective view and an enlarged side view showing the light system attached to the curved version of the light platform/mounted on a typically designed cycling helmet.
Figure 6A:
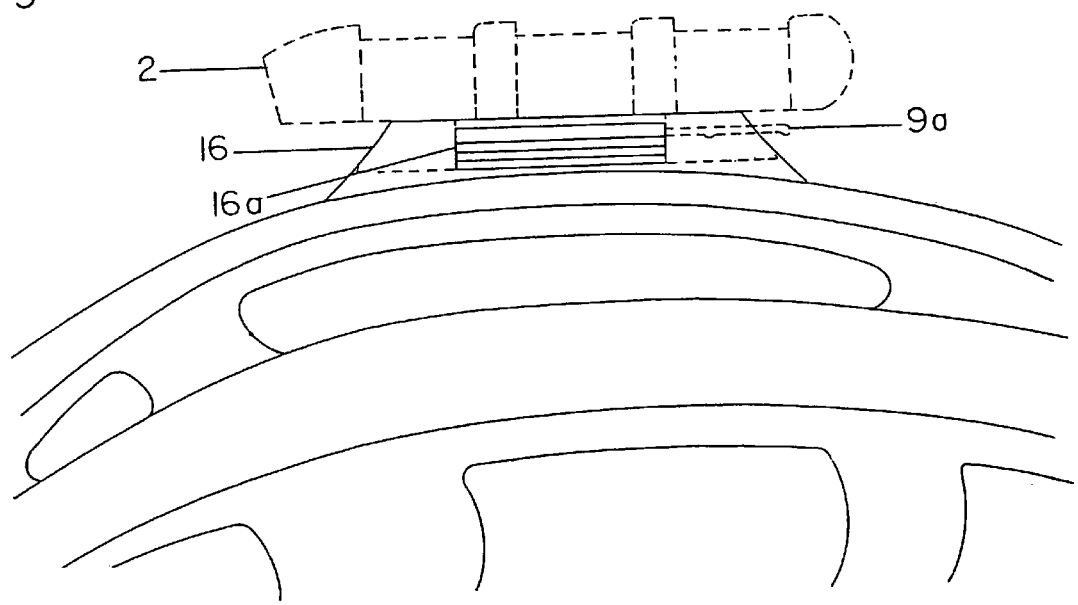

FIG. 6 represents the use of the groove light 2 with a typical cycling helmet design in which the light system 2 is mounted on and attached to it with hook & loop straps 1*b* (transparent/outlined) the same way the light 2 does with the cap 1. With exception in the case, the curved light platform 16 is utilized in place of the standard platform 11 (FIG. 1), because it better fits more rounded or aerodynamically-styled headwear, in particular, cycling helmets, as it is designed to do.

Depending on the cycling helmet design however, one, two, or three hook & loop straps can be used to fasten the mounted light into place.

Figure 7:
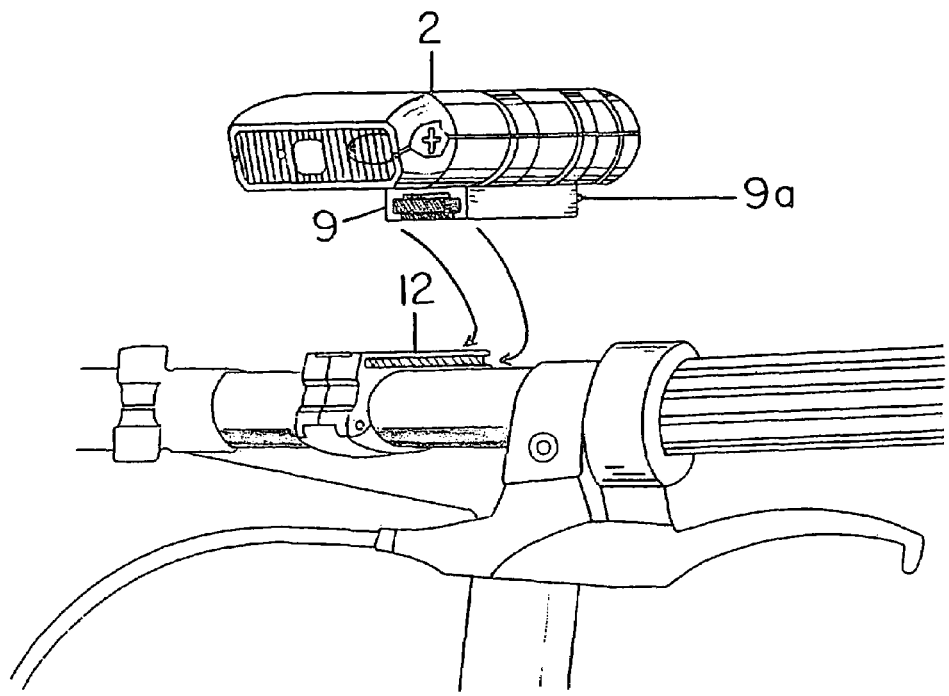
FIGS. 7 and 7a are a ¾ perspective view and an enlarged ¾ view illustrating the groove light attached to the bracket connector, pre-connected and above the handlebar bracket, and showing the same in a connected position.
Figure 7A:
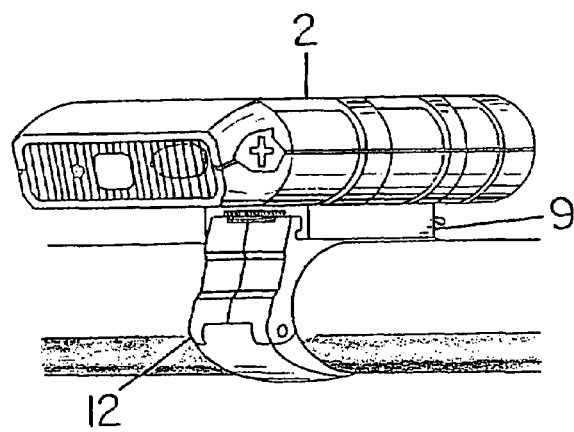

In FIG. 7, the light system 2 is illustrated in one of the primary functions of it's many uses, that of a bicycle headlight. In this illustration, the groove-light 2 is elevated above the handlebar bracket 12, which is attached to standard bike handlebars. Directly underneath the light 2 is the bracket connector 9, an adapter that is attached to the light 2 with a screw 10. The bracket connector 9 allows the light 2 to connect to the handlebar bracket 12. This is an option that allows the bi-lite cap wearer to go from a headwear-mounted to a handle bar-mounted light 2 during night cycling if the wearer so chooses. The groove light 2 with its connector, then slides onto the handlebar bracket 12 and locks into position until it is released by raising the release lever 9*a* (FIG. 7*a*) slightly.

FIG. 8 illustrates the connection of the bracket connector 9 to the handlebar bracket 12 at the beginning stage. The handlebar bracket 12 has slide tracks that the bracket connector 9 slides along on when connecting the two, and continues to slide forward on until flush with the bracket 12 and into the locked position (FIG. 8*a*). To remove the connector 9 from the bracket 12, slightly raise the release lever 9*a* and slide the connector 9 backwards on the bracket tracks until off the tracks.

FIG. 9 is an illustration of the bracket connector 9, connecting to the platform bracket 11A, which is shown inside the transparent (broken outline) view of the light platform 11. As in FIG. 8, the connector 9 slides along on the tracks of the platform bracket until it is flush with the bracket 11A (as shown in FIG. 9*a*) and in the locked position. To remove the connector 9 from the platform bracket 11A, simply raise the lever 9A slightly and slide backwards as also described in FIG. 8.

FIG. 10 is an enlarged and partially transparent illustration of the bracket connector's release lever 9*a* in part, minus the rest of the connector and the light system above it. Also showing is a portion of the platform bracket 11*a*. In this illustration, the release lever 9*a* is in the pre-lock position in perfect alignment above the platform bracket's lock-catch slot 11*b*, which the lever's lock-notch 9*b* fits perfectly into, when the connector is slid forward flush with the platform bracket 11*a*; and the notch 9*b* and slot 11*b* then come together in the locked position.

FIG. 11 is an illustration of the upper half outer case of the groove light 2, here referred to as 2*a*. It's features include the upper half groove border(s) (one of two) as indicated in FIG. 17, the outer case attachment screw 3, and the upper outline frame 2*c* for placement fit of the yellow accent lense 4*a*, as shown in FIG. 12.

In referring to FIG. 12, the lens/bulb assembly is illustrated with its collective parts intact. The lens/bulb assembly is a main internal part of the light 2 that is designed to fit in the front end of the interior chassis of the light 2. Parts to this assembly include the transparent lens 4 and its dual yellow tint accent lens extensions 4A, the halogen (or similar) light bulb 6, the inner chrome bulb light reflector 5, and the bulb retainer washer 7, which helps insulate and hold the light bulb 6 in place.

FIG. 13 is a side view illustration of the groove light's bracket connector 9, which highlights the release lever 9*a* on the rear end of the connector 9, designed with a contoured fingertip end and the length to extend outside the rear end of the platform 11. Also shown is the attachment screw 10 that securely attaches the bracket connector 9 to the light 2, just underneath the connector 9.

FIG. 13*a* illustrates the light platform 11 from the side, with an internal transparent (broken lines) view of the platform bracket 11*a*, as referred to in FIG. 9. The platform 11 serves as a support base for the groove light unit 2, providing mounting stability along with a slightly more elevated profile.

FIG. 14 is an illustrated rear view of the upper outer case 2a of the groove light 2 (its top cover). It has relatively few distinctive features, yet it is designed to be the connecting counterpart of the lower outer case section 2b of the light 2.

FIG. 14a illustrates a rear view of the lower outer case section 2b that houses the electro-mechanical assembly. Shown here from this angle is the light's power switch 2f, along with the centerpiece 2q that helps connect the lower/upper outer case sections. Also shown is the light's centering standard 8 and three of it's five joint pegs 8a, designed to perfectly align and join the light 2 with the bracket connector 9, whose top is also designed to fit the light 2.

FIG. 15 is a top view illustration of the upper outer case 2a/top cover, highlighting the groove borders 2e and the attaching screw hole 3a minus the screw 3. The outer shell of both the upper and lower outer cases are made of a sturdy plastic.

FIG. 15c illustrates the lower outer case 2b in a full diagram of its internal parts, minus the lens/bulb assembly unit. The diagram starts with the open lens bay 2p, where the lens/bulb unit fits into the molded-in separation wall 2r, between the lens bay 2p and batteries tray section, designed to hold three separately partitioned "AA" batteries inside the interior frame 2o of both upper and lower cases (2a and 2b) sections. On top of the centerpiece 2q of the separation wall 2r is the threaded screw hole 3b which aligns with screw hole opening 3a on the upper case 2a. The groove borders 2e are highlighted again on the edges of both outer cases 2a and 2b, as are the upper 2c and lower 2d frame openings for the dual lens extensions 4a. A transparent sample (broken lines) of three "AA" batteries 18 is shown, along with the bottom threaded screw hole 10a designed for attachment of the bracket connector 9 to the whole light 2 using attaching screw 10. At both ends of the batteries tray are three post contacts (6 total) 2j, three negative and three positive terminal symbols 2n and 2m respectively, two metal base grounding plates 2h, that connect to the power switch contacts 2i, the side battery pads 2k, the three battery symbols 2l, the powerswitch inner housing 2g, and the power switch button 2f.

FIG. 16 illustrates the light 2 connected to the light platform 11 from the front, highlighting the focus point 4b on the lens face, which helps focus the brightness of the light beam.

In FIG. 17, the groove light 2 is illustrated from the side connected to the platform 11. The outer body of the light 2 is highlighted showing the groove borders 2e that aid in securing the hook & loop fastening straps 1b (FIG. 1) from slipping/sliding out of place along the light's body when it's mounted on the cap. At the rear of the platform 11, the release lever 9a of the bracket connector 9 can again be seen (refer to FIG. 8).

Highlighted again on the front side of the light 2 is the uniquely shaped yellow accent lens 4a, designed as a side indicator light similar to a car's parking light, in effect when the light is turned on; also a safety aid during night activities.

In FIG. 18, the light 2 is illustrated from the bottom minus the platform 11, again highlighting features of its outer case design, such as the hook & loop strap groove borders 2e, the power switch button 2f, located at the rear, the bracket connector 9 and its release lever 9a, and the attachment screw 10 that secures the bracket connector to the light's 2 chassis.

FIG. 19 illustrates the bottom of the light platform 11 highlighting its underside features, which are the adhesive square patch 11e that aids in secure mounting, and the rubber grid outer edge 11d, designed to help prevent slipping/sliding of the light from the mounted position.

Figure 20:
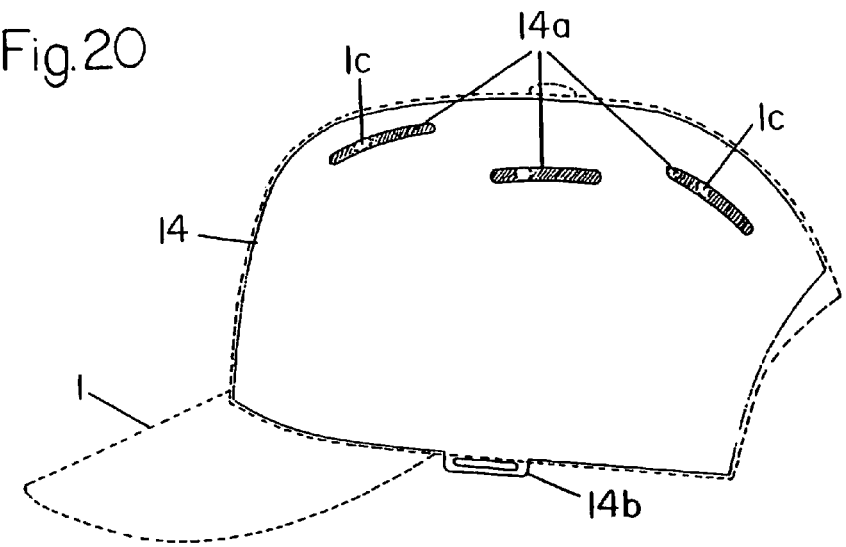
FIGS. 20, 20a and 20b are a transparent side perspective view illustrating the cap guard system (or CGS) and how it fits inside the outlined cap, as well as front and rear perspective views showing the same.
Figure 20A:
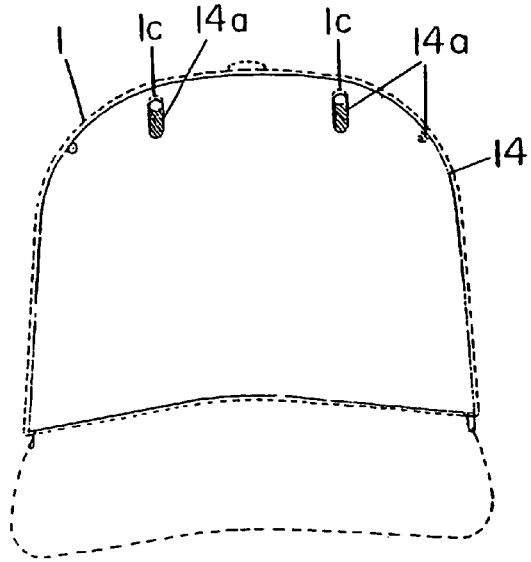
Figure 20B:
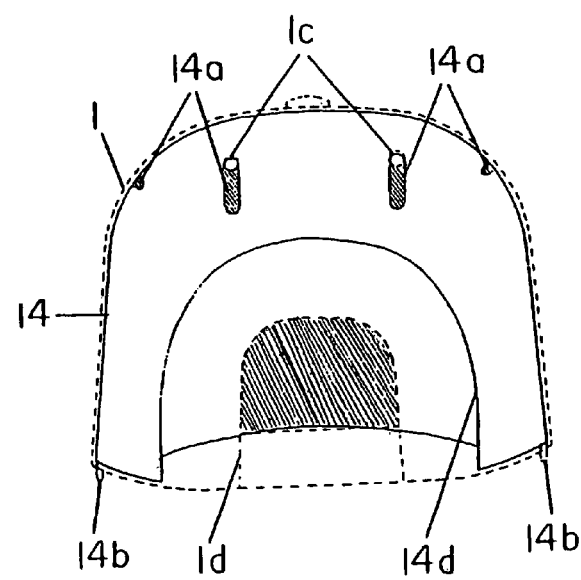

In FIG. 20, the outer shell 14 component of the cap guard system (CGS) is illustrated within the transparent (broken outline) cap 1. The outer shell is made of a sturdy plastic (or polyurethane) material, approximately 1/16-inch thick, featuring six contoured vent "slot-holes" 14a (three shown here) along the upper sides of the shell 14. These vent "slot-holes" 14a are designed to align with the cap's vent holes 1c. Also shown is one of two chin strap hook tabs 14b, for use with a forthcoming chin strap design.

FIG. 21 illustrates the fitting sequence steps of the cap guard system's (CGS) three components, starting first with the connecting of the inner head guard 15 to the outer shell 14, and then the combined two fitting inside the cap 1. Also illustrated are the vent "slot-holes" 15a of the inner guard 15, the vent slot holes 14a on the outer shell, as well as the hook & loop straps 1b, cap slots 1a, and the vent holes 1c on the cap 1.

Figure 22:
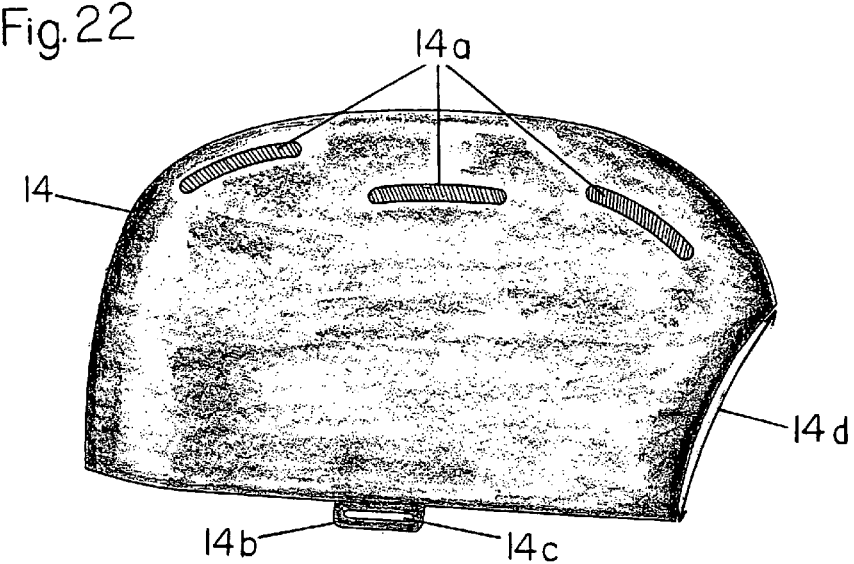
FIGS. 22, 22*a* and 22*b* are a side perspective view of the outer shell of the cap guard system, also a front view and a rear view of the same.
Figure 22A:
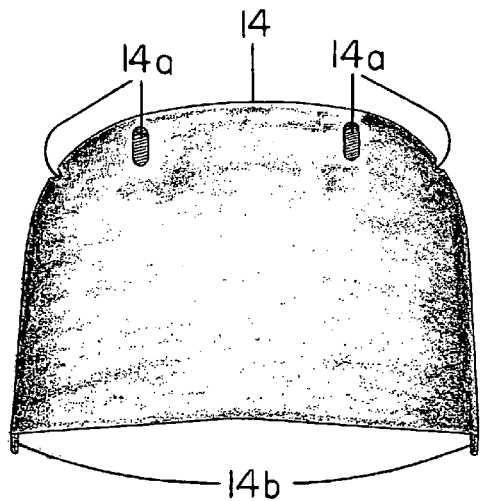
Figure 22B:
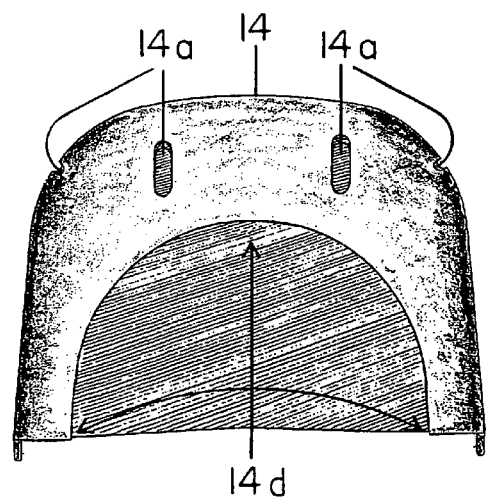

FIG. 22 illustrates a closer side view of the shape design of the CGS's outer shell 14, designed to generally match the contoured shape of the inside of this invention's base unit cap 1, and most other "modified" sports caps when fitted inside. As stated earlier, the outer shell 14 will come in different sizes to accommodate the cap 1 wearer, and the shell 14 can be removed as easily as inserted. Other features include the vent slots 14a, the hook tabs 14b, and strap slots 14c (one each shown), and the contoured rear opening 14d, designed to match up with the rear of the cap 1 and its adjustable band (FIG. 22b).

Figure 23:
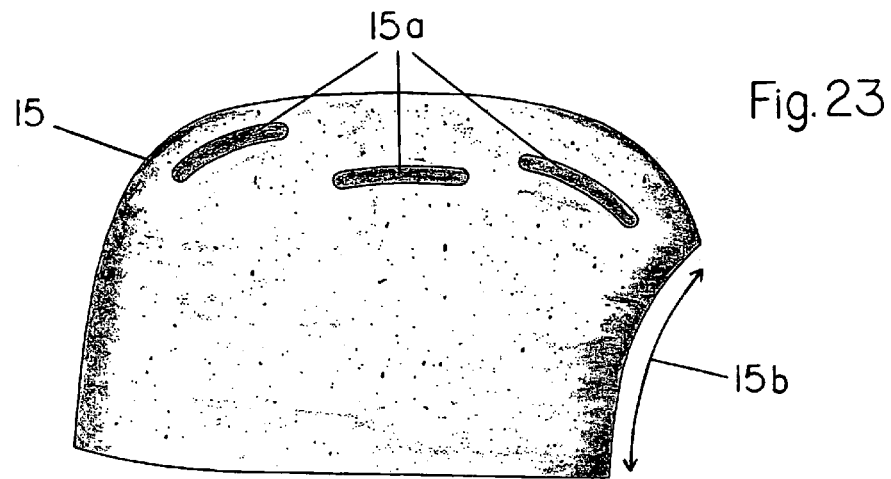
FIGS. 23, 23*a* and 23*b* are a side perspective of the styrofoam insert portion of the CGS, including a front and rear view of the same.
Figure 23A:
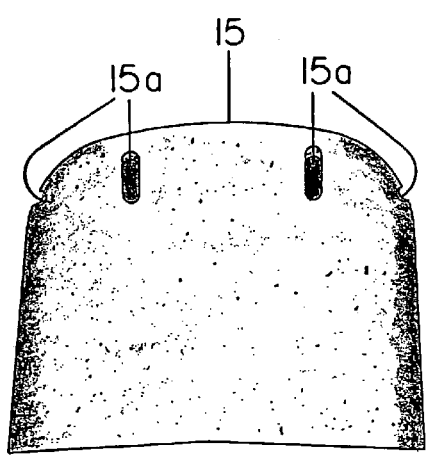
Figure 23B:
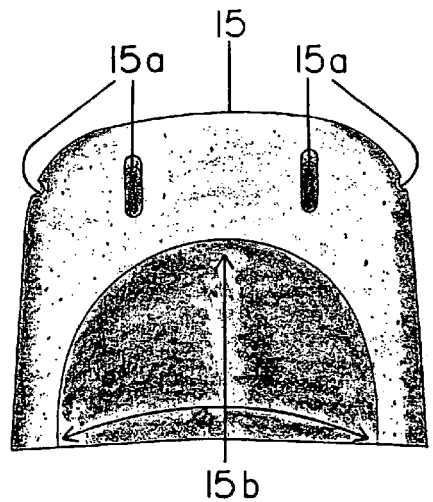

In FIG. 23, a side view of the inner guard 15 component of the cap guard system (CGS) is illustrated. The inner guard 15 is made of a hardened/smooth surfaced styrofoam material of approximately 7/16-inch thickness, with the option of variable styrofoam thicknesses, as part of the CGS' design parameters to accommodate any wearer/user's preference. The purpose of the inner guard 15 is to provide the bi-lite cap wearer with limited head protection during various activities (recreational, etc.), when used in conjunction with the outer shell 14 and cap 1 (FIG. 21). The inner guard's features include six vent slots 15a (three shown) that align with the six vent slots 14a of the CGS' outer shell, when the two are conjoined, also a contoured rear opening 15b (refer to FIG. 23b) designed to match up with the rear opening of the outer shell 14d (refer to FIG. 22b).

We claim:

1. An illumination device releasably attached to a modified headwear comprising;

a) A light source consisting of an outer housing having multiple sectional grooves along said outer housing of equal size, respectively, for allowing containment of hook and loop fastening straps therein, with at least three batteries providing power to said illumination device;

b) An elevating platform with an interior bracket component connecting to a bracket connector means attached underneath said illumination device for providing a stationary and stable base to said illumination device mounted on a base support unit;

c) Said hook and loop fasteners attached to square adhesive patches on the inside top portion of said base support unit, each strap of said hook and loop fasteners protruding through individual embroidered slots at the outer top of said base support unit, said straps placed over said outer housing and into said multiple sectional grooves thereby fastening said illumination device to said base support unit.

2. The illumination device according to claim 1 further comprising said base support unit being a sports cap with six embroidered slots along a central top portion with one of each said slots portioned along right and left bottom sides, said cap having a total of six said adhesive hook and loop fastening patches along an inner central top portion allowing connection of said hook and loop fastening straps.

3. The illumination device according to claim 1 further comprising said bracket connector attached to the bottom of said illumination device by a screw which then connects said illumination device to a cap mounting platform, by sliding into tracks of an interior bracket component of said platform and locking said illumination device in place.

4. The illumination device according to claim 1 wherein the base support unit further comprises a two part insertably removable head protection guard wherein an first part is an outer guard conforming in shape with the inner side of said base support unit which is made of a thin yet rigid lightweight material that has two chin strap hook tabs, one each, at bottom left and right sides respectively, said hook tabs being able to fit through said embroidered slots, individually, on the bottom left and right sides of said base support unit, and wherein a second part is an inner guard conforming in shape with the outer guard made of a sturdy lightweight material approximately six to eight times thicker than said outer guard, whereby said inner guard precisely fits inside of and releasably attaches to said outer guard by connection of two hook fastener patches on the top of said outer guard to two loop fastener patches on the inside top of said inner guard.

5. The illumination device in accordance with claim 1 comprising a curved elevating platform that connects to said illumination device, providing a stationary and stable base for said illumination device when said illumination device is mounted on top of an aerodynamically shaped headwear, specifically a bicycle helmet.

6. The illumination device in accordance with claim 1 wherein said base support unit further comprises a reflective strip across an upper rear opening of said base support unit, allowing a user to be seen from behind when said reflective strip is illuminated by a potential trailing night traffic's lights.

7. An illumination device accordance with claim 1 releasably attachable to a handlebar bracket component made of a rigid non-metal material with an indented front, and removably attachable with a screw for the use of mounting said device onto the handlebars of any typical bicycle when said handlebar bracket is first attached to a bicycle's handlebar by placing open said bracket onto the handlebar, then clamping it's rounded swing arm fully shut and tightening said bracket into place with said screw, wherein said bracket connector currently attached with a screw to said illumination device then releasably connects to said handlebar bracket by sliding into the connecting tracks of said bracket and locking into place.

* * * * *